Figure 1:
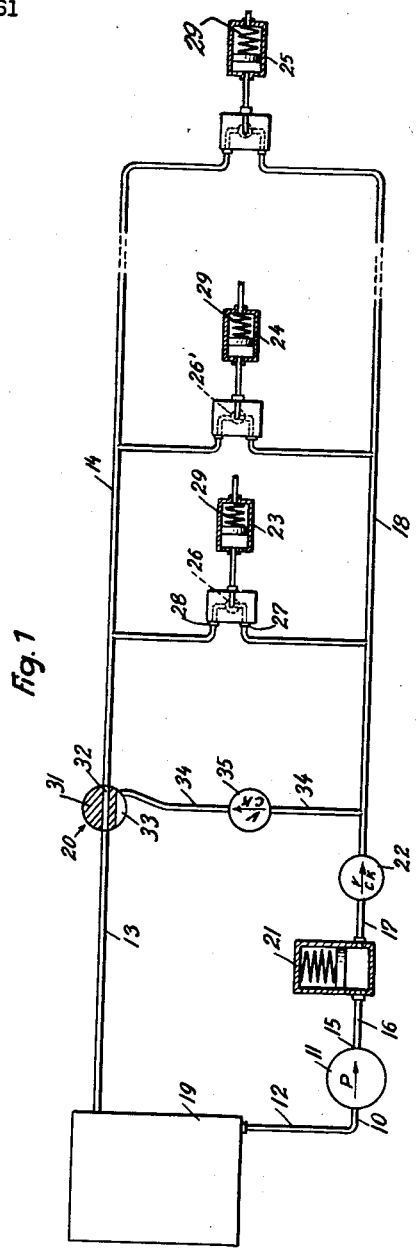

Jan. 29, 1963  E. J. H. FIALA ET AL  3,075,356
FLUID-OPERABLE ACTUATING SYSTEM IN A MOTOR VEHICLE
Filed March 21, 1961  4 Sheets-Sheet 1

Inventors
ERNST J. H. FIALA
RUDOLF ANDRES
BY Dicke, Craig & Freudenberg
ATTORNEYS Jan. 29, 1963  E. J. H. FIALA ET AL  3,075,356
FLUID-OPERABLE ACTUATING SYSTEM IN A MOTOR VEHICLE
Filed March 21, 1961  4 Sheets-Sheet 2

Inventors
ERNST J. H. FIALA
RUDOLF ANDRES
BY Dicke, Krieg & Freudenberg
ATTORNEYS

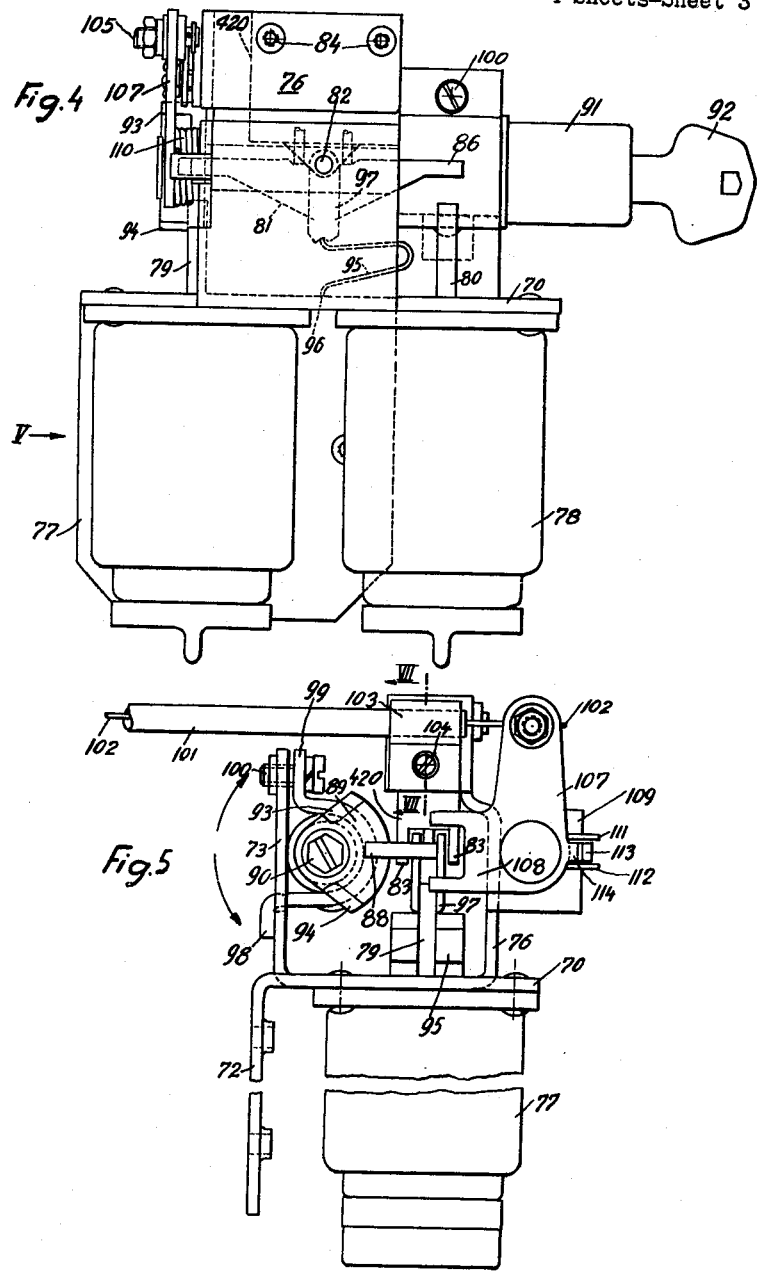

Jan. 29, 1963  E. J. H. FIALA ET AL  3,075,356
FLUID-OPERABLE ACTUATING SYSTEM IN A MOTOR VEHICLE
Filed March 21, 1961  4 Sheets-Sheet 4
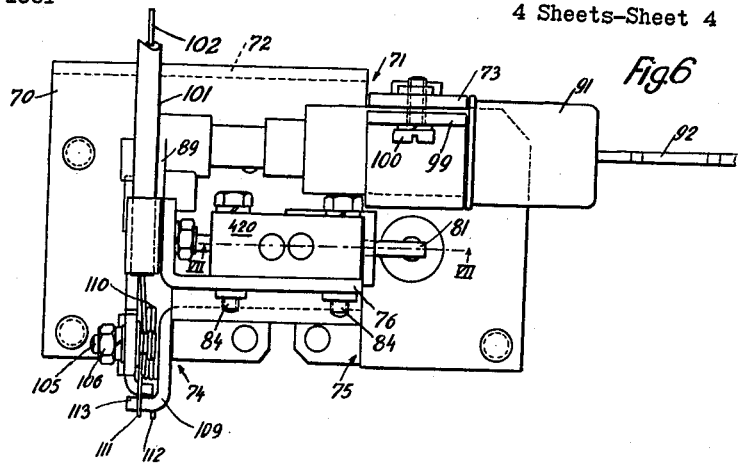
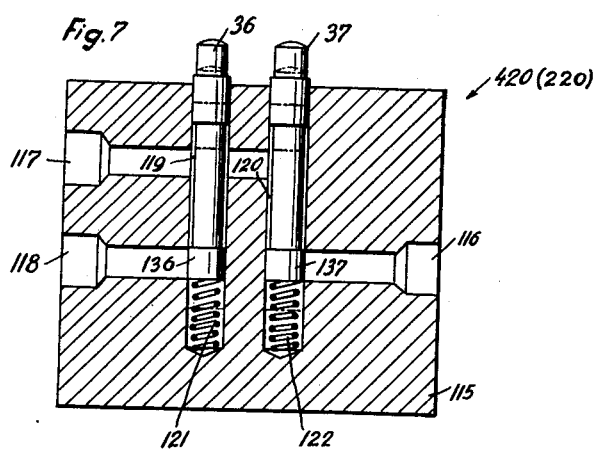
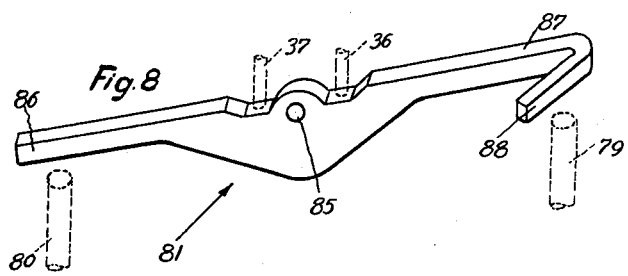
Inventors
ERNST J. H. FIALA
RUDOLF ANDRES
BY *Dicke, Craig & Freudenberg*
ATTORNEYS

United States Patent Office 3,075,356
Patented Jan. 29, 1963

3,075,356
FLUID-OPERABLE ACTUATING SYSTEM IN A MOTOR VEHICLE
Ernst J. H. Fiala and Rudolf Andres, Sindelfingen, Kreis Boblingen, Germany, assignors to Daimler-Benz Aktiengesellschaft, Stuttgart-Unterturkheim, Germany
Filed Mar. 21, 1961, Ser. No. 97,306
Claims priority, application Germany July 8, 1960
11 Claims. (Cl. 60—97)

Our invention relates to a fluid-operable system for actuating windows, door latches or any other desired devices in motor vehicles and pertains, more particularly, to a system of this type including an apparatus which is disposed at a control center station in the vehicle and serves for optionally releasing or locking the actuated windows, door locks, baggage compartment lids etc., said apparatus being provided with a valve controlling the pressure fluid circuit and adapted to be actuated by various manually operable means including electromagnetic means. A system of this type forms the subject matter of a co-pending patent application, Serial No. 73,432, filed December 2, 1960 (common assignee).

It is the object of our invention to provide simple and effective means for the manual mechanical operation of the locking and releasing apparatus in event of a failure of the source of electrical power provided for the operation of the electromagnetic means. More particularly, it is the object of our invention to provide means for operating the control apparatus from the outside of the vehicle by means of a key and/or from the inside of the vehicle by the passengers by operation of a handle, the key or said handle acting on the apparatus in a purely mechanical manner independent of the condition of the source of current.

With the afore-said objects in view, the invention consists in the novel combinations and arrangements of parts hereinafter described in their preferred embodiments, pointed out in the subjoined claims and illustrated in the annexed drawing, wherein like parts are designated by the same reference characters throughout the several views.

The advantages of the invention as here outlined are best realized when all of its features and instrumentalities are combined in one and the same structure, but useful devices may be produced embodying less than the whole.

Figure 2:
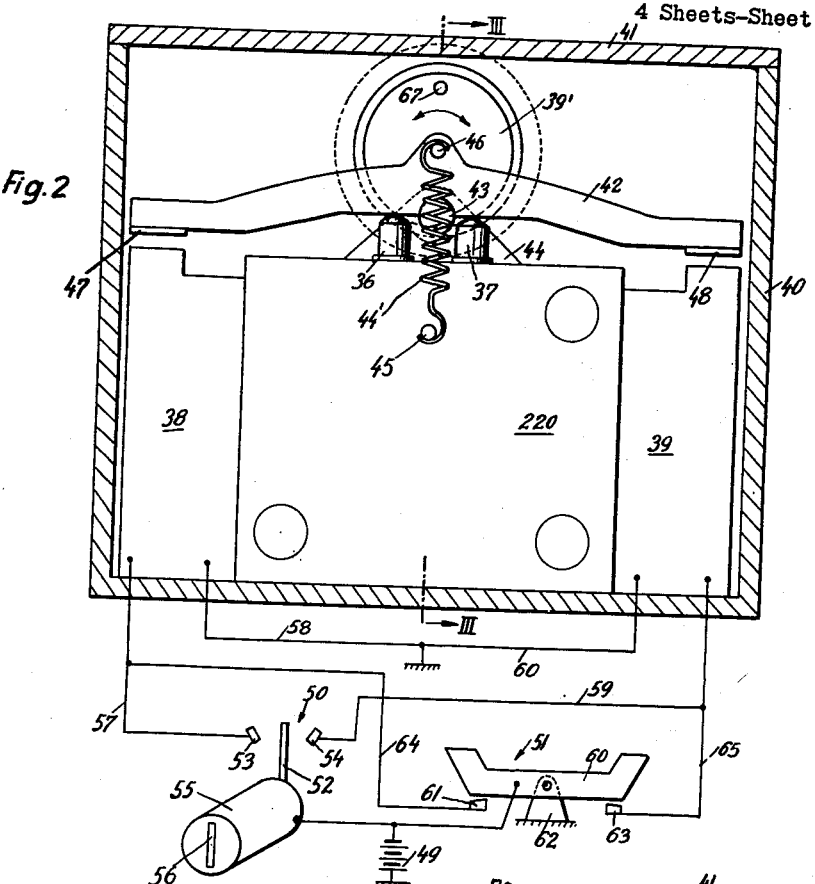
Figure 3:
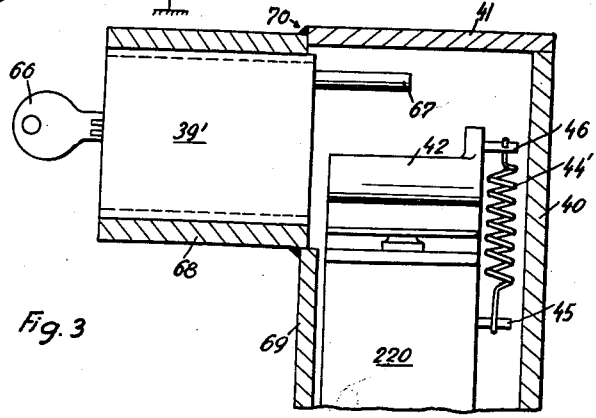

It will be obvious to those skilled in the art to which the invention appertains that the same may be incorporated in several different constructions. The accompanying drawings, therefore, are submitted merely as showing the preferred exemplification of the invention. In the drawings:

FIG. 1 is an electrical and hydraulical circuit diagram of our novel actuating system, FIG. 2 is an elevation of the control apparatus and of control switch means included in this system and connected by electrical conductors, FIG. 3 is a partial side view of the control apparatus shown in FIG. 2, the housing being shown in section along the line III—III of FIG. 2, FIG. 4 is an elevation of a modified control apparatus, FIG. 5 is a side view of the apparatus shown in FIG. 4 viewed in the direction of the arrow V, FIG. 6 is a top view of the apparatus shown in FIGS. 4 and 5, FIG. 7 is the section through the valve included in the apparatus, said section being taken along the line VII—VII of FIGS. 5 and 6 shown on an enlarged scale, and FIG. 8 is a perspective view of a two-armed lever and of valve stems operated thereby, said lever and said stems being included in the apparatus shown in FIGS. 3, 4 and 5.

As shown in FIG. 1, the inlet 10 of a pump 11 is connected with a return pipe composed of sections 12, 13 and 14, whereas the outlet 15 of the pump 11 is connected with a pressure pipe composed of sections 16, 17 and 18. An oil reservoir 19 is inserted between the sections 12 and 13 of the return pipe and valve means 20 to be described later in detail are inserted between the sections 13 and 14 of the return pipe. A pressure accumulator 21 is inserted between the sections 16 and 17 of the pressure pipe and a check valve 22 is inserted between the sections 17 and 18 of the pressure pipe. The system further includes a plurality of fluid-operable actuators diagrammatically indicated as rams 23, 24 and 25. It is to be understood, however, that these actuators may be formed by any fluid-operable power-producing devices, such as rotary fluid motors or the like. These actuators may serve various purposes in the motor vehicle, for instance the purpose of closing or opening a window, closing or opening a door latch, folding or unfolding a foldable roof or the like. Each actuator 23, 24 or 25 is alternatively connectable with section 18 of the pressure pipe for actuation in one direction or with section 14 of the return pipe for actuation in the opposite direction, for instance by a spring 29. For that purpose each actuator may be provided with manually settable valve means, such as a rotatable plug valve indicated at 26 for the alternative connection of the cylinder chamber of the actuator either with an inlet port 27 or with an outlet port 28, both ports being provided in the housing of the plug valve 26. The rotary plug of this valve may be provided with a handle for manual operation. Inlet port 27 is in permanent communication with the outlet pipe section 18 and outlet port 28 is in permanent communication with the return pipe section 14.

The valve means 20 is movable to an unlocking position in which the return pipe section 13 is in open communication with the return pipe section 14 or to a locking position in which the return pipe section 13 is closed, whereby discharge of pressure oil from the outlets 28 is prevented. Where an actuator, such as 23, serves to close a window and moves in closing direction, when the manually operable plug valve 26 assumes the position shown connecting the actuating ram with the inlet port 27, it will not be possible to open this window, when the valve means 20 has been adjusted to its locking position because the oil that has been fed into the cylinder space of the actuator can be no longer discharged therefrom. Hence, it will appear that the valve means 20 constitutes locking means inserted in the fluid circuit 16, 17, 18, 27, 26, 28, 14, 13, 19, 12 and that the fluid of this circuit is prevented from circulating therein when the return pipe section 13 is closed by the valve means 20.

Where an actuator, such as 24, serves to move a door latch into active or inactive position, the handle connected with the plug of the plug valve 26' may constitute the door handle or may be operable by a press button mounted adjacent to the door handle for depression causing the actuator 24 to be connected by the plug valve 26' with the return pipe section 14, whereby the actuator 24 will be caused to withdraw the latch into inactive position permitting the door to be pulled open by the handle. Hence, the actuator when charged with the pressure fluid performs a closing motion whereas discharge of the pressure fluid from the actuator causes an opening motion. When such discharge is prevented by the valve means 20, an attempt to perform an opening motion manually, for instance an unauthorized attempt to pull a window open, will build up pressure in the cylinder space of the actuator from which the oil cannot escape and this pressure will resist any manual effort to open the window and will keep the same closed.

The valve means 20 is preferably formed by a three-way valve movable between a first position (shown in FIG. 1) establishing communication between the outlet 28 of valve 26 and the return pipe section 13 and a second position which is reached by rotation of the plug 31 in anti-clockwise direction through an acute angle. In the first position of the plug 31 a diametrical passageway thereof registers with and connects ports communicating with the return pipe sections 13 and 14. In the second position, however, the passage-way 32 is out of registry with such ports, whereby the port communicating with pipe section 13 is closed. Another passage-way 33 of the plug, however, will then establish a communication between two valve ports one of which communicates with the return pipe section 14, whereas the other one communicates with a pipe 34 which communicates with pressure pipe section 18 and includes a check valve 35 opening towards the plug valve 20.

From the foregoing description it will be understood that the additional valve means 20 provided in addition to the valves 26, 26' etc. are so coordinated to the pipes 13, 14 and 34, and the outlets 28 as to alternatively establish communication of each outlet 28 either with the return pipe section 13 for actuation of the actuators in the opening direction or with the pressure pipe section 18 through pipe 34. This latter alternative connection has the following effect: The check valve 35 positively prevents any discharge of pressure oil from the actuators. Therefore, any windows which have been previously closed by their hydraulic actuators cannot be opened by manual effort in an attempt to pull the window open. A window, however, which is still open, when the plug valve 20 is moved to its second position, the valve 26 of the actuator of such window being set to connect the actuator cylinder space with the outlet 28, will be automatically closed, when the valve 20 is turned to its second alternative position, since this has the effect of admitting pressure oil to the actuator of the window via the elements 15, 16, 17, 34, 32, 14, 28, 26. The window so closed will then be locked because the check valve 35 prevents return flow of the pressure oil.

The locking means which, in the embodiment shown, is formed by the valve 20 and electromagnetic means for actuating it is included in a control apparatus constituting a central control station affording a possibility of locking and releasing all of the actuators.

The control apparatus illustrated in FIGS. 2 and 3 includes a valve, such as valve 20, for connecting the upstream section 14 of the return pipe optionally either with the downstream section 13 thereof or with the pressure pipe 18 via the branch pipe 34 thereof. While in FIG. 1 the valve 20 is shown diagrammatically as a valve of the rotatable plug type we prefer to use a valve 220 shown in FIGS. 2 and 3 having a body in form of a rectangular block and including a pair of stems 36 and 37 which are slidably guided in the valve body and project from the top thereof. This valve is similar to a valve 420 included in the embodiment of the control apparatus shown in FIGS. 4, 5 and 6 and described in detail hereinbelow with reference to FIG. 7. Therefore, a detailed description of this valve may be dispensed with at this time. It may suffice to state that the body of valve 220, just as the bodies of valve 20 and of valve 420, has three ports two of which are connected with the sections 13 and 14 of the return pipe, while the third port communicates with the branch pipe 34 of the pressure pipe. Each of the stems 36 and 37 is movable between a normal position shown in FIG. 2 and an actuated depressed position. The stem 37 in its depressed actuated position is operative to connect the upstream section 14 with the downstream section 13 to afford return movement of the actuators 23, 24, 25, etc. The stem 36, however, is operative in its actuated depressed position to connect the upstream section 14 with the branch 34 of the pressure pipe to thereby prevent a return movement of the actuators 23, 24 and 25.

Moreover, the apparatus illustrated in FIGS. 2 and 3 includes electromagnetic means 38, 39 coordinated to the stems 36, 37 for movement thereof, a manually operable member 39' mounted on the vehicle for operation from the outside thereof and coordinated to the valve stems 36, 37 for the selective mechanical operation thereof, and a support 40 which carries the valve 220, the electromagnetic means 38, 39 and the manually operable member 39'. In the embodiment shown in FIGS. 2 and 3 this support is formed by a housing having a removable cover 41, the valve being mounted on the bottom of such housing with the projecting ends of the stems 36 and 37 pointing upwardly. The electromagnetic means comprises a pair of electromagnets 38 and 39 mounted on the bottom of the housing 40 for optional actuation of one or the other of the arms of a two-armed lever 42 carried by a horizontal pivot pin 43 and overlying the stems 36 and 37. The pivot pin 43 is journaled in brackets 44 which are suitably fixed to the support 40, for instance through the intermediary of the body of valve 220. A helical traction snap spring 44' connects a stationary pin 45 mounted on the body of valve 220 with a pin 46 fixed to the two-armed lever 42 above the pivot pin 43. Armatures 47 and 48 are secured to the ends of the two-armed lever for attraction by the respective electromagnets 38, 39. When one of the electromagnets has been energized and has attracted the opposed armature, thereby tilting the two-armed lever 42, the spring 44' will keep the lever in such tilted position until the other electromagnet will be energized.

Our novel actuating system, furthermore, includes a source of electric current, for instance a battery 49, and manually operable control switch means, such as switches 50 and 51 for optionally connecting the source of current 49 with one or the other of the two electromagnets 38 and 39. When the electromagnet 39 is so connected to be energized, it will attract the armature 48 and tilt the two-armed lever 42 in clockwise direction, thereby depressing valve stem 37. This has the effect of establishing communication between the return pipe sections 13 and 14, whereby the actuators 23, 24 and 25 will be conditioned for release by appropriate manipulation of the valve 26, 26', etc. When the electromagnet 38 is energized, however, it will tilt the two-armed lever in anticlockwise direction, thereby permitting stem 37 to be returned by a suitable spring to be described later, while depressing stem 36. This operation will connect the upstream section 14 of the return line with the pressure branch line 34 and will disconnect it from the downstream section 13, thereby locking all of the actuators and preventing any release thereof.

The manually operable control switch means 50 and 51 are preferably disposed outside of and separate from the housing 40, 41 and are connected therewith and with the electromagnets 38, 39 therein by suitable electrical conductors.

More particularly, the switch 50 includes a pivotal switch arm 52 and a pair of contacts 53 and 54 selectively engageable by the switch arm 52. The latter is connected with one terminal of the battery 49, the other terminal thereof being grounded, and is fixed for actuation by rotation of the cylindrical member 55 of a door lock operable by a key to be inserted into a key-hole 56. Hence, by inserting this key and by turning it one way or the other the switch arm 52 may be engaged with contact 53 or contact 54. Contact 53 is connected by a conductor 57 to one terminal of the electromagnet 38, the other terminal thereof being grounded by a conductor 58. The contact 54 is connected by a conductor 59 with one terminal of the electromagnet 39, the other terminal of which is grounded by a conductor 60.

The switch 51 which may be mounted on the dashboard of the vehicle comprises a switch lever 60 rockably mounted on a bracket 62 and capable of selectively engaging a contact 61 or a contact 63, the former being connected to a branch 64 of conductor 57 while the latter is connected to a branch 65 of conductor 59. By suitably rocking lever 60 connected to the battery 49, the driver may optionally lock or unlock the actuators.

The manually operable member 39′ is preferably a key-operable lock including a cylindrical core having a key slot for insertion of a key 66 and being rotatable by such key in one direction or in the opposite direction. The cylindrical casing 68 of the lock 39′ is mounted on the back 69 of the housing 40 with its axis disposed horizontally, a suitable circular aperture being provided in the back plate 69, the housing 68 being welded to the edge of such aperture at 70. The pin 67 extends above the two-armed lever 42 for engagement with one or the other of its arms, when the key 66 is turned one way or the other. By turning the key 66 in clockwise direction with reference to FIG. 2, the stem 37 may be depressed to thereby condition the actuators for release, whereas rotation of the key 66 in the anticlockwise direction will lock all of the actuators by depression of the left-hand lever arm and of the stem 36.

As the valve 220 is preferably disposed in the vicinity of the reservoir 19 and as the latter is preferably disposed below the motor hood, the housing 40 may be preferably mounted in the front portion of the vehicle on a fixed side wall portion thereof in such a manner that the housing 68 will project through such side wall portion outwardly, thus rendering the key-hole of lock 39′ accessible from the outside for insertion of key 66. In this manner, the actuators may be conditioned for release by a person from the outside of the vehicle even if the battery 49 should be exhausted or if the electrical conductor should be defective.

In FIGS. 4, 5 and 6 we have shown a modified design of the control apparatus, in which additional manually operable means mounted inside the vehicle are mechanically connected with the support for imparting swinging movement to the two-armed lever in the direction causing said lever to actuate the releasing stem 37.

In this embodiment the support comprises a sheet metal bracket having a rectangular horizontal portion 70 provided with a cut 71 in its rear marginal portion, FIG. 6, with a depending flange 72 at the left of the cut 71, with an upstanding flange 73 disposed at the right of the cut 71, with two cuts 74 and 75 in its front margin and with an upstanding flange 76 between the cuts 74 and 75.

A pair of solenoid coils 77 and 78 is mounted in parallel spaced relationship on the bottom face of the bracket portion 70 and suitably fixed thereto. Each coil has an axially movable core (not shown) to which a rod 79, or 80 respectively, is fixed which projects upwardly out of the coil and, upon energization of the coil, is pushed upwardly for engagement with the respective arm of a two-armed lever 81 which has a similar function as the two-armed lever 42 of the embodiment shown in FIGS. 2 and 3. The lever 81 is mounted for pivotal movement about a horizontal pivot pin 82 journaled in spaced depending projections 83 of a block-shaped body of the valve 420 fixed by threaded bolts 84 to the back face of bracket flange 76.

The two-armed lever 81 shown in FIG. 8 has a bore 85 through which pin 82 extends. Its right-hand arm 86 with reference to FIGS. 4 and 6 extends over the rod 80 being normally spaced therefrom, whereas its left-hand arm 87 extends over the upper end of rod 79 and has a bent portion 88 for engagement by the manually operable member which, in this embodiment, is formed by a sector-shaped plate 89 fixed by a threaded bolt 90 to the end face of a horizontal rotatable core of a lock 91, the core being provide with a key slot for insertion of a key 92. By means of this key the sector-shaped plate 89 may be turned about its horizontal axis in clockwise direction or in anticlockwise direction with reference to FIG. 5. The plate 89 has a pair of angularly spaced projections 93 and 94 for alternative engagement with the portion 88 of lever 81.

The lever 81 is biased into one or the other of its tilted positions by a U-shaped leaf-spring 95 having end portions bent in opposite directions, the lower end portion engaging a recess 96 provided in the bracket portion 70, while the upper end portion engages a notch in the bottom face of an upstanding U-shaped yoke 97 which straddles the lever 81 and is fixed thereto. The spring 95 is so biased as to exert pressure upon the lower end of the yoke 97, thus acting as a snap spring tending to keep the lever 81 in tilted position into which it can be brought either by one of the solenoid-actuated rods 79, 80 or by rotation of the key-actuated sector-shaped plate 89.

The cylindrical housing of the lock 91 is secured to the front face of the bracket portion 73 by a clip having one arm 98 hooked into an aperture of the bracket portion 93 and having the other arm 99 secured to the bracket portion 73 by a threaded bolt 100.

To the extent described hereinabove this embodiment is so similar to that illustrated in FIGS. 2 and 3 that a description of the operation may be dispensed with. As mentioned hereinabove, however, the embodiment shown in FIGS. 4, 5 and 6 further comprises manually operable means mounted inside of the vehicle and mechanically connected with the support for imparting swinging movement to the lever 81 in the direction causing the lever to actuate the valve stem 37, whereby the actuators will be unlocked. This will become necessary, if the actuators are locked during travel of the vehicle and if the electrical power should fail, for instance, as the result of an accident, so that the doors could not be opened by operation of the manually operable control switch means 51.

The additionally provided manually operable means mounted inside the vehicle and mechanically connected with the support formed by the bracket 70—76 comprises a Bowden-cable composed of a sheathing 101 and of a core 102 guided therein for longitudinal displacement, the end portion of the sheathing 101 being fixed by a clip 103 and a threaded bolt 104 to an angularly bent section of bracket portion 76 so as to extend horizontally at right angles to the lever 81 above the same. The end portion of the core 102 extends through a bore of a threaded bolt 105 and by a nut 106 screwed thereon is clamped to the upper arm of a bell crank 107 which carries the threaded bolt 105 and has a horizontally extending lower bifurcated arm 108 straddling the bent portion 88 of lever 81 with considerable clearance. The bell crank 107 is mounted on a horizontal pivot pin extending substantially parallel to the two-armed lever 81 and carried by a forwardly bent ear 109 of bracket portion 76. The bell crank 107 is resiliently held in the position shown in FIG. 5 in which the bifurcations of its arm 108 are held in spaced relationship to the lever portion 88. For that purpose the bearing pin of lever 107 is surrounded by a spiral wire spring 110 having radially projecting end portions 111 and 112 straddling both a projection 113 of ear 109 and a projection 114 of lever 107, thereby tending to hold the projections 113 and 114 in registry. The other end of the Bowden-cable not shown is fixed to a suitable handle (not shown) mounted on the dashboard. When this handle is operated, the core 102 of the Bowden-cable will be pulled to the left with reference to FIG. 5 swinging bell crank 107 in anticlockwise direction. As a result, the upper bifurcation of arm 108 will depress the lever portion 88 causing the lever 81 to actuate the valve stem 37 (FIG. 8).

The valve 220, or 420 respectively, will now be described with reference to FIG. 7. It comprises a block-shaped valve body 115 having three ports 116, 117 and 118. The port 116 communicates with the downstream section 13 of the return pipe. The port 117 communicates with the upstream section 14 of the return pipe and the port 118 communicates with the branch 34 of the pressure pipe 18. The stems 36 and 37 are slidably guided in parallel vertical bores 119 and 120 which accommodate helical restoring springs 121 and 122 tending to keep the stems 36 and 37 in the normal position shown in FIG. 7. The central sections of the bores 119 and 120 are in permanent communication with the port 117, whereas the communications of the bores 119 and 120 with the ports 118 and 116 are normally blocked by piston sections 136 and 137 of the stems. Hence, it will appear, that depression of stem 37 unblocks the communication of port 116 with the bore 120 and thereby establishes communication between the ports 116 and 117. Depression of stem 36, however, unblocks the communication of bore 119 with port 118 and thereby connects the latter with the port 117. Above the piston sections 136 and 137 the stems 36 and 37 have a reduced diameter to provide clearance within the bores 119 and 120 permitting flow therethrough.

From the foregoing it will be seen that this invention is one well adapted to attain all of the ends and objects hereinabove set forth, together with other advantages which are obvious and which are inherent to the system.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a motor vehicle, an actuating system comprising a plurality of fluid-operable actuators, a fluid circuit including a pressure pipe and a return pipe, said pipes being alternatively connectable with each of said actuators for the optional actuating movement or return movement thereof, locking means in said circuit movable between an unlocking position in which said circuit is operative to afford said return movement and a locking position in which said circuit is closed to prevent said return movement, electromagnetic means coordinated to said locking means for movement thereof, a source of electric current, means to maintain a hydraulic pressure within said fluid circuit when said locking means is in said locking position, manually operable control switch means for optionally connecting said source of current to said electromagnetic means, and a manually operable member mounted on the vehicle for operation from the outside thereof and coordinated to said locking means for the mechanical operation thereof, said manually operable member effecting operation of said locking means independent of said source of electric current and said electromagnetic means.

2. System as claimed in claim 1 in which said locking means is formed by a valve, said electromagnetic means being ineffective to move said manually operable member, said system further comprising a support carrying both said valve and said operable member.

3. System as claimed in claim 1 in which said locking means is formed by a valve, said system further comprising a housing encasing said valve, said electromagnetic means and said manually operable member, said electromagnetic means being ineffective to move said manually operable member, said switch means being disposed outside of and separate from said housing, and electrical conductors connecting said switch means to said electromagnetic means.

4. System as claimed in claim 3 in which said manually operable member is a key-operable lock including a cylindrical core rotatable by a key and provided with means for engaging and operating said valve.

5. In a motor vehicle, an actuating system comprising a plurality of fluid-operable actuators, a fluid circuit including a pressure pipe and a return pipe, said pipes being alternatively connectable with each of said actuators for the optional actuating movement or return movement thereof, locking means in said circuit movable between an unlocking position in which said circuit is operative to afford said return movement and a locking position in which said circuit is closed to prevent said return movement, electromagnetic means coordinated to said locking means for movement thereof, a source of electric current, manually operable control switch means for optionally connecting said source of current to said electromagnetic means, a manually operable member mounted on the vehicle for operation from the outside thereof and coordinated to said locking means for the mechanical operation thereof, said locking means being formed by a valve inserted between an upstream section and a downstream section of said return pipe and having three ports two of which are connected with said sections, while the third port communicates with said pressure pipe, said valve including a pair of stems, each movable between a normal position and an actuated position, one of said stems in said actuated position being operative to connect said upstream section with said downstream section and the other one of said stems being operative in said normal position to connect said upstream section with said pressure pipe, said electromagnetic means and said manually operable member being coordinated to said stems for the optional actuation of a selected one of said stems.

6. In a motor vehicle, an actuating system comprising a plurality of fluid-operable actuators, a fluid circuit including a pressure pipe and a return pipe, said pipes being alternatively connectable with each of said actuators for the optional actuating movement or return movement thereof, locking means in said circuit movable between an unlocking position in which said circuit is operative to afford said return movement and a locking position in which said circuit is closed to prevent said return movement, electromagnetic means coordinated to said locking means for movement thereof, a source of electric current, manually operable control switch means for optionally connecting said source of current to said electromagnetic means, a manually operable member mounted on the vehicle for operation from the outside thereof and coordinated to said locking means for the mechanical operation thereof, said locking means being formed by a valve inserted between an upstream section and a downstream section of said return pipe and having three ports two of which are connected with said sections, while the third port communicates with said pressure pipe, said valve including a pair of stems, each movable between a normal position and an actuated position, one of said stems in said actuated position being operative to connect said upstream section with said downstream section and the other one of said stems being operative in said normal position to connect said upstream section with said pressure pipe, said system further comprising a support carrying said valve, said electromagnetic means and said manually operable member, a two-armed lever mounted on said support for engagement of each of said stems by one arm thereof for actuation, said electromagnetic means comprising a pair of electromagnets mounted on said support for optional actuation of one or the other of the arms of said two-armed lever, said manually operable member being mounted on said support for swinging said two-armed lever in one or the other direction.

7. In a motor vehicle, an actuating system comprising a plurality of fluid-operable actuators, a fluid circuit including a presure pipe and a return pipe, the latter including a downstream section and an upstream section, means for alternatively connecting said actuators with said upstream section or with said pressure pipe for optional actuating movement or return movement, a valve inserted between said upstream section and said downstream section of said return pipe and having three ports two of which are connected with said sections, while the third port communicates with said pressure pipe, said valve including a pair of stems, each movable between a normal position and an actuated position, the first one of said stems in said actuated position being operative to connect said upstream section with said downstream section to afford said return movement and the second one of said stems being operative in said actuated position to connect said upstream section with said pressure pipe to prevent said return movement, electromagnetic means coordinated to said stems for the optional actuation of a selected one of said stems, a manually operable member coordinated to said stems for the optional mechanical operation thereof, a support carrying said valve, said electromagnetic means and said manually operable member and being mounted on said vehicle for operation of said manually operable member from the ouside thereof, a source of electric current and manually operable control switch means for optionally connecting said source of current to said electromagnetic means, said switch means being mounted on said vehicle separate from said support.

8. System claimed in claim 7 further comprising a two-armed lever mounted on said support for alternative engagement of said stems by the arms of said lever for actuation, said electromagnetic means comprising a pair of electromagnets mounted on said support for optional actuation of one or the other of the arms of said lever, said manually operable member being formed by a key-operable lock including a cylindrical core rotatable by said key and provided with means for engaging and swinging said lever in one or the other direction.

9. System as claimed in claim 8 in which said manually operable control switch means includes a selector switch for selectively connecting said source of current to one or the other of said electromagnets.

10. System claimed in claim 7 further comprising a two-armed lever mounted on said support for alternative engagement of said stems by the arms of said lever for actuation, said electromagnetic means comprising a pair of electromagnets mounted on said support for optional actuation of one or the other of the arms of said lever, said manually operable member being formed by a key-operable lock including a cylindrical core rotatable by said key and provided with means for engaging and swinging said lever in one or the other direction, said system further comprising manually operable means mounted inside of said vehicle and mechanically connected with said support for imparting swinging movement or said lever in the direction causing said lever to actuate said first one of said stems.

11. In a motor vehicle provided with a passenger compartment and having windows and doors, an actuating system for the windows and doors of the vehicle comprising a plurality of fluid-operable actuators, each of said doors and windows being opened and closed by a respective one of said actuators, a fluid circuit including a pressure pipe and a return pipe, said pipes being selectively connectable with each of said actuators for the actuating movement or return movement thereof, locking means in said circuit movable between an unlocking position in which said circuit is operative to afford said return movement and a locking position in which said circuit is closed to prevent said return movement, a source of electric current, electromagnetic means to actuate said locking means, manually operable control switch means for connecting said source of current to said electro magnetic means to selectively move said locking means to the unlocking position or the locking position thereof, means for maintaining a hydraulic pressure within said fluid circuit when said locking means is in said locking position, a manually operable member mounted within said vehicle for operation from the passenger compartment of the vehicle independently of said electric current and said electromagnetic means to enable mechanical operation of said locking means, and a manually operable member mounted on said vehicle for operation from the outside thereof independently of said electric current and said electromagnetic means to enable mechanical operation of said locking means.

References Cited in the file of this patent

UNITED STATES PATENTS

| | | |
|---|---|---|
| 719,669 | Hoppe | Feb. 3, 1903 |
| 2,328,311 | Vickers | Aug. 31, 1943 |
| 2,621,037 | Riedel | Dec. 9, 1952 |
| 2,643,515 | Harsch | June 30, 1953 |
| 2,874,958 | Mercier | Feb. 24, 1959 |